May 28, 1957 F. P. LONTE 2,794,074

REDUCTION OF FAR-END CROSSTALK IN A TELEPHONE CABLE AT CARRIER FREQUENCIES

Filed July 29, 1953 4 Sheets-Sheet 1

INVENTOR.
FLORUS PIETER LONTE
BY

INVENTOR.
FLORUS PIETER LONTE
BY
[signature]
agt

INVENTOR.
FLORUS PIETER LONTE
BY
[signature]

INVENTOR.
FLORUS PIETER LONTE
BY 2,794,074
Patented May 28, 1957

2,794,074

REDUCTION OF FAR-END CROSSTALK IN A TELEPHONE CABLE AT CARRIER FREQUENCIES

Florus Pieter Lonte, The Hague, Netherlands, assignor to Staatsbedrijf der Posterijen, Telegrafie en Telefonie, The Hague, Netherlands Application July 29, 1953, Serial No. 371,086

Claims priority, application Netherlands August 8, 1952

5 Claims. (Cl. 179—78)

The invention relates to a method for reducing the far-end crosstalk between pairs in a telephone cable at carrier frequencies, insofar as the couplings between the pairs are magnetic couplings having capacitance and conductance unbalance components of opposed signs which mainly increase in absolute value with frequency; a coupling compensation meter for carrying out this method and a cable to which this method has been applied.

The above-mentioned couplings occur in cable pairs having the same pitch. Such pairs are found in coil-loaded cables. In these cables it is the principal coupling. It is important of course that adapting old coil-loaded cables for carrier transmission should be done in a simple way. For this purpose the loading coils must be removed and special care must be taken with the balancing, because at higher frequencies, crosstalk increases. The near-end crosstalk can, for the greater part, be avoided by using all the wires in a cable for traffic in one and the same direction only. This can also be achieved by allotting in one cable, for go and return traffic, two non-overlapping frequency bands. The far-end crosstalk however still remains to be reduced, especially between pairs having equal pitch.

In "The Bell System Technical Journal," vol. XVII, 1938, pp. 137–161, a balancing method is described, in which, after transpositions have been made in the places of the removed loading coils so as to reduce the couplings to a minimum, the desired crosstalk attenuation is obtained by inserting in all the pairs, self-inductance coils having adjustable iron cores, which coils must be mutually coupled in the proper way. These coils and cores, however, must be specially made for this purpose.

If it is desired to install the balancing units in a cable junction in the ground instead of in a panel in the repeater station, the correct adjustment of the coils is not a simple matter.

These difficulties are overcome by the present invention because the coupling between two pairs, *ab* and $a^1$ $b^1$, is balanced by connecting a capacitor between one wire of the latter pair ($b^1$) and one wire of the former pair (*a*) and a capacitor of about the same value and a resistor in series between the same wire of the former pair (*a*) and the other wire of the latter pair ($a_1$), the other wire of the former pair (*b*) remaining unconnected. This arrangement permits cyclic permutations of $b^1$, *a*, $a^1$ and *b*, so that after 1 and 3 permutations a cable coupling having a real and an imaginary part of signs opposite to those in the original case, and after 2 permutations a cable coupling having a real and an imaginary part of the same signs as in the original case are balanced. An alternative arrangement consists in connecting instead of one capacitor between two wires, a capacitor between these two wires and a second capacitor between the two remaining wires, the two last-mentioned capacitors together having the same capacitance value as one capacitor. Also, instead of the one capacitor and one resistor in series between two wires, a capacitor and a resistor in series between these two wires and a capacitor and a resistor in series between the two remaining wires, the two capacitors together having the same capacitance value as the one capacitor and the two resistors together having the same conductance value as the one resistor. In addition, the ratio of the capacitances being equal to the ratio of the resistances.

It is observed that balancing by the connection of a resistor and a capacitor in series between two wires of the relevant pairs and of a capacitor between the same wire of one pair and the other wire of the other pair is known. See for this matter "Annexe 27 au Tome III de la XV$_e$ Assemblée Plenière du C. C. I. F., Paris, 26–30 Juillet 1949." In the method described there, however, the capacitor connected in series with the resistor is always the same, irrespective of the amount of coupling to be balanced between the pairs and it is obviously provided only to avoid galvanic contact. Consequently, its capacitance is as a rule not approximately equal to that of the other, adjustable capacitor. In fact the method does not relate to the balancing for carrier currents of magnetic couplings between pairs having the same pitch, and as appears from the values stated for the capacitors, it would not be suitable for this purpose.

The invention will be described in detail in connection with Figures 1 to 11.

Figs. 5, 6*a*, 6*b* and 7 diagrammatically show the balancing network in several different forms as it can be applied according to the invention.

Figure 8:
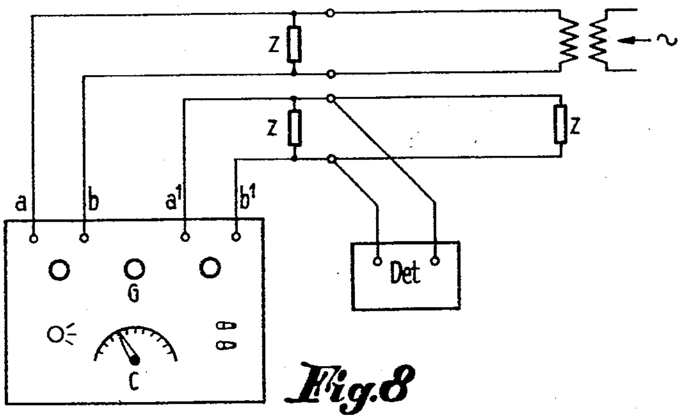

Fig. 8 is an electrical schematic diagram of a balancing meter connected between two cable pairs.

Figure 9:
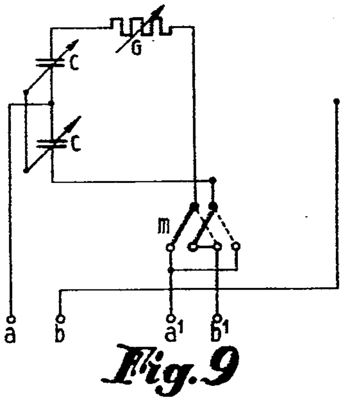
Figure 10:
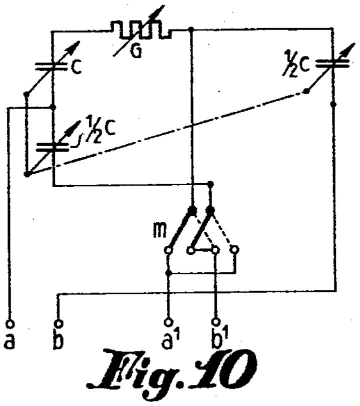
Figure 11:
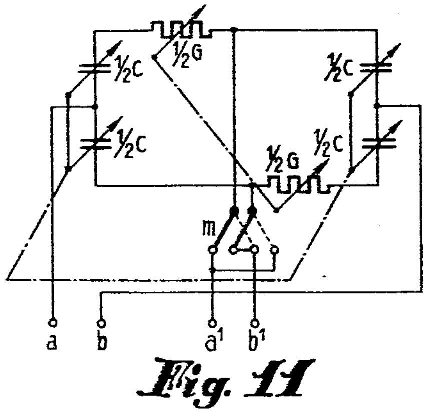

Figs. 9, 10 and 11 are electrical schematic diagrams of several different embodiments of the balancing meter according to the present invention.

The example given of an embodiment of the invention concerns the reduction of far-end crosstalk between cable pairs having the same pitch in a star-quad cable from which the loading-coils have been removed.

The invention, however, can be applied to any telephone cable consisting of pairs as far as the couplings between these pairs are magnetic couplings have C- and G-components of opposed signs increasing mainly with frequency.

Figure 1:
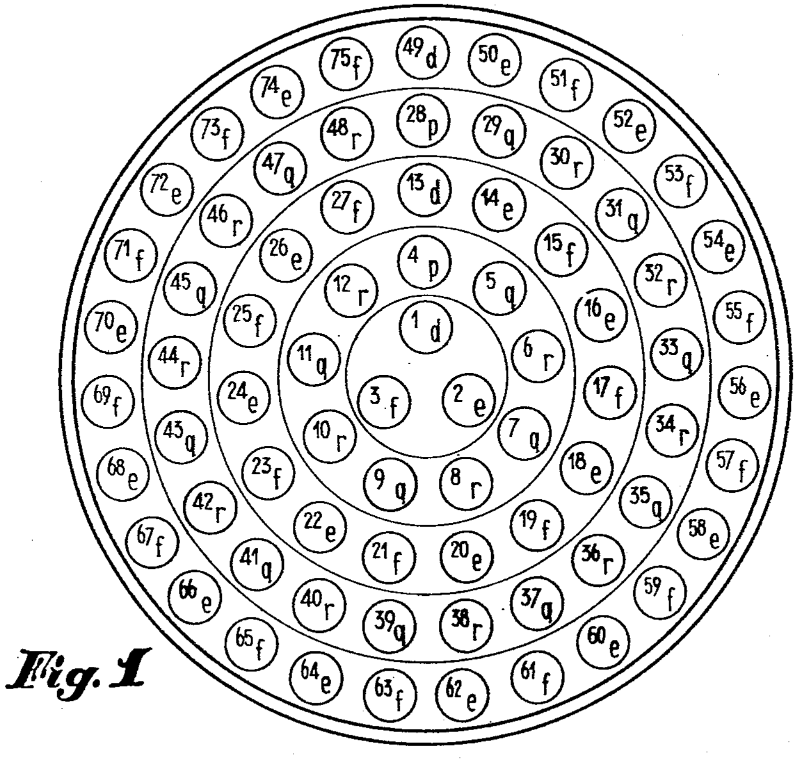
Fig. 1 is a diagrammatic cross-section of a star-quad cable intended for use at voice frequencies.

The construction of a star-quad cable will be considered first, reference being had to Fig. 1. From the cross-section shown in this figure it is to be seen that the cable contains 75 star-quads arranged in 5 layers. Each quad consists of two pairs. The pairs have 6 different pitches, denoted by *d*, *e*, *f*, *p*, *q* and *r*. Twisting of pairs with different pitches is done in star-quad cables, as well as in multiple-twin and twin cables, in order to keep the couplings between adjacent pairs as small as possible. In carrier cables, pairs having the same pitch are completely avoided.

It is seen in Fig. 1 that the pairs of every first group in a layer have special pitches (*d* or *p*), the pairs in the following groups having alternately the same pitches, and the layers having alternately the same pitches for their pairs (*e* and *f*, and *q* and *r*, respectively).

Figure 5:
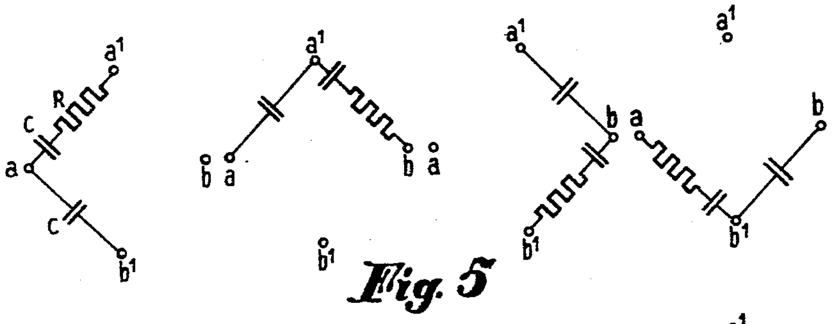

If the far-end crossstalk values of all the combinations in a reel of such a cable are measured at a frequency of e. g. 60 kc./s., the pairs having the same pitch, and not belonging to the same group are seen to exhibit the strongest couplings. A strong magnetic coupling via the lead sheath is predominant in these pairs. A characteristic feature of such couplings is that the real part, expressed by the G-component e. g. in micromhos ($G_k$) and the imaginary part, expressed by the C-component e. g. in ($C_k$) have opposed signs, which means that in micromicrofarads Figs. 5 to 7 the balances of these G- and C-components must be placed in adjacent sides of the square $aa^1bb^1$. If they had the same sign, this would mean that the balances would have to be placed in the same side or in opposite sides. In Figs. 5 to 7 the cross-sections of the two wires of each of the pairs *a*, *b* and $a^1$, $b^1$ are arranged diagonally opposite each other in a square.

Figure 2:
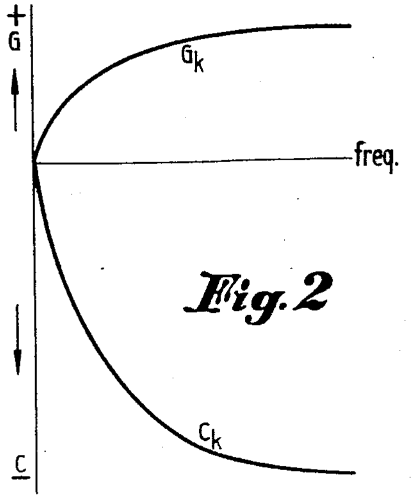
Fig. 2 is a graphical representation, for two pairs having the same pitch in such a cable, the G- and C-component of the magnetic coupling as a function of the frequency.

Fig. 2 shows graphically the two components as a function of the frequency. In a practical case e. g. for a cable length of 20 km., values were found for $G_k$ and $C_k$ of +68 micromhos and −520 micromicrofarads, respectively, at a frequency of 10 kc./s. of +160 micromhos and −1980 micromicrofarads, respectively, at 60 kc./s., and of +210 micromhos and −1940 micromicrofarads, respectively, at 120 kc./s.

With the given equality of pitches this kind of coupling only depends on the phase of twist and on reflections in the lead sheath (distance to and curvature of the lead sheath), and not on the special kind of cable construction between pairs having the same pitch and belonging to the same quad, the coupling is much smaller, because these pairs always lie in planes perpendicular to each other (in other words along the entire cable length, the phase of twist is invariably as favorable as possible).

If, at the splicing of the voice frequency cable, no transpositions have been effected between pairs outside the groups, balancing of the pairs having equal pitches and not belonging to the same group will often be sufficient for using the cable for carrier transmission, as in this case only these combination will exhibit an insufficient far-end crosstalk attenuation. The use for carrier transmission with a wide frequency band will only have to be restricted then to pairs lying in the outer layers, because in other cases corrections for the differences in transmission time and attenuation may be necessary. If there have been made transpositions between pairs outside the group, in order to increase the far-end crosstalk attenuation as much as possible before providing the counter-coupling, there will be, as a result of the interconnecting introduced thereby, a greater number of combinations suitable for balancing. In both cases, however, the method according to the present invention can be applied.

Figure 3:
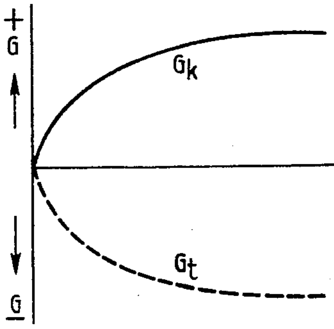
Fig. 3 is a graphical representation showing how the G-component of the magnetic coupling is neutralized by the G-component of a series connection of a resistor and a capacitor.
Figure 4:
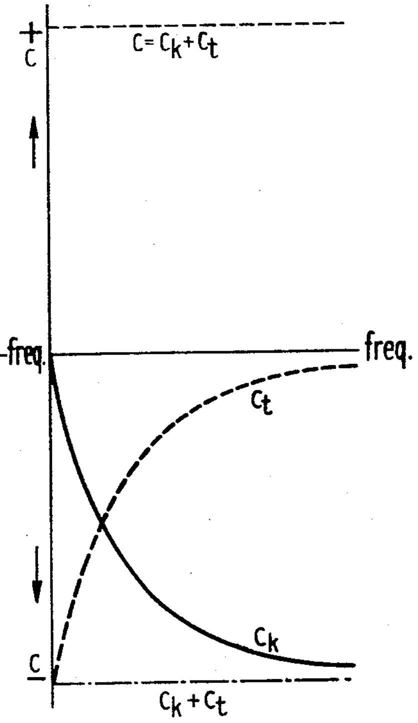
Fig. 4 is a graphical representation showing how the C-component of the additional coupling consisting of a series connection of a resistor and a capacitor is added to the C-component of the magnetic coupling, so that for all frequencies the sum is approximately the same and can be neutralized by a single capacitor.

This method makes use of the fact that the G-component, $G_t$, of a series connection of a resistor and a capacitor exhibits a similar curve, when plotted against the frequency, as the G-component, $G_k$, of the cable coupling, as indicated in Fig. 2. Consequently, such series connection can be provided between two wires of the relevant pairs, so that if the resistance value of the resistor is correctly chosen, the G-component of the cable coupling is neutralized (Fig. 3). For this purpose the resistance value of the resistor must be so chosen that at the highest frequency at which the balancing must still be good and at which the resistance value of the resistor determines the conductance value of the series connection of resistor and capacitor, the conductance of the resistor must be approximately equal to that of the cable coupling. As, however, the G- and C-component of the series connection have the same signs, the C-component of the cable coupling, $C_k$, is increased by this measure by the C-component of the provided additional coupling $C_t$. If the value of the capacitor is correctly chosen, however, the sum of the two components will be approximately equal for all frequencies and can be neutralized by a capacitor of about the same capacitance value C (Fig. 4). The capacitance value of the capacitor in the series connection must be so chosen therefore that it is approximately equal to the C-component of the cable coupling, as the latter is at the highest frequency at which the balancing must still be good. In that case it is possible to neutralize the sum of the C-components of cable coupling and series connection by a capacitor of about the same capacitance value as the capacitor in the series connection. In practice the easiest way is to take two equal capacitors and to determine the values of the resistor and the capacitor by means of the balancing meter to be described hereafter, which is adapted to the method according to the present invention.

The balancing unit can be connected between the pairs *ab* and $a^1$ $b^1$ of the combination to be balanced as indicated in Fig. 5 by connecting a series connection of a resistor and a capacitor between the wires *a* and $a^1$ (or *b* and $b^1$) and an equally large capacitor as the first between *a* and $b^1$ (or *b* and $a^1$). In the case of opposite signs of the G- and C-component of the magnetic cable coupling, the locations of the series connection and of the single capacitor must be interchanged. In view of the side-to-phantom couplings it may be preferable, however, especially at higher frequencies, to provide a symmetrical balancing as is indicated in Fig. 7, the two ways corresponding to different signs of the components of the magnetic cable coupling. In this way the phantom-to-side crosstalk is not altered by the balancing unit, whereas in the method according to Fig. 5, as well as in the intermediate forms according to Figs. 6*a* and 6*b*, the balancing may cause an increase of the phantom-to-side crosstalk. Other distributions of capacitance and resistance over the balances in two opposite sides of the square are equally possible of course, providing the capacitors in the two opposite sides possess together the capacitance required and the resistors in the two opposite sides possess together the conductance required for the balancing, and moreover in the case of resistance and capacitance in series the ratio of the capacitances is equal to that of the resistances.

For determining the values of the resistor and the capacitor of the balancing unit, use is made of a special balancing meter. This meter is connected in the usual way between two pairs *ab* and $a^1b^1$, as is indicated in Fig. 8. Both pairs are terminated at the receiving ends with their impedance Z. By adjusting the knobs G and C, which causes the connection of balancing means according to the principle of the invention, the minimum is determined first in the detector, the test voltage having a frequency of 120 kc./s. being supplied to one pair (*ab* in Fig 8). Then the values of G and C are determined after reversing the circuit, i. e. connecting the test voltge to $a^1b^1$ and the detector to *ab*. From the values thus determined the average is taken for the definitive balance. By adjusting the meter to it, the effect of this balance can then quickly be examined for all the desired frequencies, before it is definitively mounted. As the meter is provided with the balancing means according to the principle of the invention, all the contingent effects produced by the introduction of these balancing means are measured together and contribute to the adjustment obtained. As a result of this the balancing means that are provided later have the expected effect.

Figure 6A:
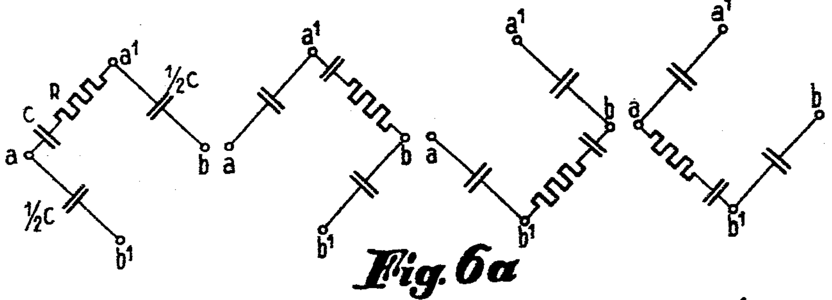
Figure 6B:
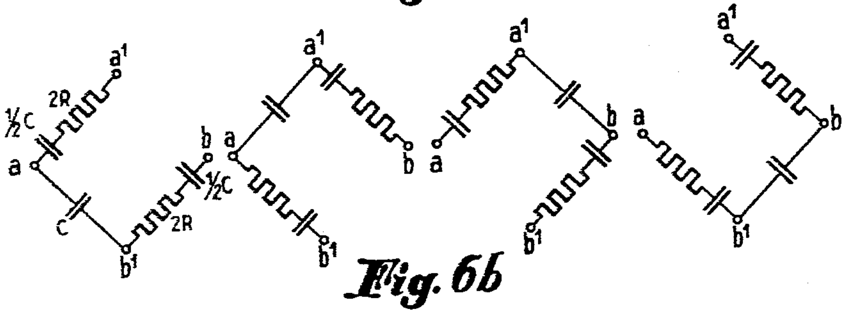
Figure 7:
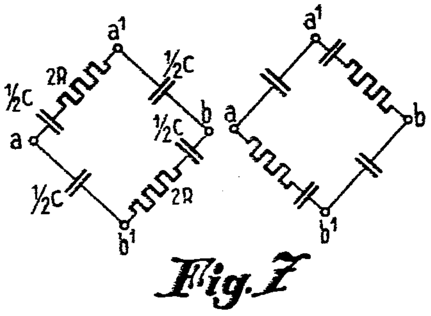

Diagrams of the balancing meter are shown in Figs. 9, 10 and 11, which correspond to the balancing methods according to Figs. 5, 6*a* and 7, respectively. The balancing meter is preferably equipped with equal capacitors and equal resistors according to the diagram of Fig. 11, because Fig. 7 shows the most ideal form of the balancing means (no change of side-to-phantom coupling). During the adjustment this equality continues to exist, because the relevant adjusting knobs are mechanically coupled. The meter can also be constructed of course for the other forms of the balancing means according to the principle of the present invention.

It will be clear from Fig. 9 that by throwing the switch *m*, i. e. interchanging the connections of wires $a^1$ and $b^1$, the meter is rendered suitable for measuring the required balancing in the case of either a positive G-component and a negative C-component of the cable coupling, or a negative G-component and a positive C-component. The remaining balancing methods according to Figs. 5 and and 6*a* can be obtained by interchanging the connections of wires *a* and *b*.

If desired, a switch can be provided, which, when thrown connects the series connection of resistor and capacitor in parallel to the single capacitor (not shown in the figure). It may be advantageous to have this possibility at one's disposal, because if the differences in damping and in phase shift are relatively large (which may occur if the pairs to be balanced lie in different layers) the value of the directly or inversely connected coupling may exhibit the same signs for the G- and C-component. In such a case the additional balancing coupling can still be determined by throwing the said switch, so that the mean values of the components of before and after the poling that do have the expected difference of sign can be computed too.

By adjusting the G-switch at *o* it is further possible to measure capacitive couplings too.

While I have illustrated and described what I regard to be the preferred embodiment of my invention, nevertheless it will be understood that such is merely exemplary and that numerous modifications and rearrangements may be made therein without departing from the essence of the invention, I claim:

1. Apparatus for reducing the far-end crosstalk between a first and a second cable pair in a telephone cable due to magnetic coupling having capacitive and conductive components of opposite polarity comprising, in combination, a first capacitor having a first and a second terminal; a resistor having a first and a second terminal, the first terminal of said first capacitor being connected to a first wire of the first cable pair and its second terminal being connected to the first terminal of said resistor, the second terminal of said resistor being connected to a first wire of the second cable pair; and a second capacitor having a first terminal connected to the first wire of the first cable pair and having a second terminal connected to the second wire of the second cable pair, said first and said second capacitors being of substantially the same value.

2. Apparatus for reducing the far-end crosstalk between a first and a second cable pair in a telephone cable due to magnetic coupling having capacitive and conductive components of opposite polarity comprising, in combination, a first capacitor having a first and a second terminal; a resistor having a first and a second terminal, the first terminal of said first capacitor being connected to a first wire of the first cable pair and its second terminal being connected to the first terminal of said resistor, the second terminal of said resistor being connected to a first wire of the second cable pair; a second capacitor having a first terminal connected to the first wire of the first cable pair and having a second terminal connected to the second wire of the second cable pair; and a third capacitor having a first terminal connected to the first wire of the second cable pair and having a second terminal connected to the second wire of the first cable pair, each of said second and third capacitors being respectively equal to substantially one-half of the value of said first capacitor.

3. Apparatus for reducing the far-end crosstalk between a first and a second cable pair in a telephone cable due to magnetic coupling having capacitive and conductive components of opposite polarity comprising, in combination, a first capacitor having a first and a second terminal; a first resistor having a first and a second terminal, the first terminal of said first capacitor being connected to a first wire of the first cable pair and its second terminal being connected to the first terminal of said resistor, the second terminal of said resistor being connected to a first wire of the second cable pair; a second capacitor having a first terminal connected to the first wire of the first cable pair and having a second terminal connected to the second wire of the second cable pair; a third capacitor having a first and second terminal; and a second resistor having a first and a second terminal, the first terminal of said third capacitor being connected to the second wire of said first cable pair and its other terminal being connected to the first terminal of said second resistor, the second terminal of said second resistor being connected to the second wire of the second cable pair, the first and second resistors being substantially equal to each other, and each of said first and third capacitors being respectively equal to substantially one-half of said second capacitor.

4. Apparatus for reducing the far-end crosstalk between a first and a second cable pair in a telephone cable due to magnetic coupling having capacitive and conductive components of opposite polarity, comprising, in combination, a first capacitor having a first and a second terminal; a first resistor having a first and a second terminal, the first terminal of said first capacitor being connected to a first wire of the first cable pair and its second terminal being connected to the first terminal of said resistor, the second terminal of said resistor being connected to a first wire of the second cable pair; a second capacitor having a first terminal connected to the first wire of the first cable pair and having a second terminal connected to the second wire of the second cable pair; a second resistor having a first and a second terminal, the first terminal of said third capacitor being connected to the second wire of said first cable pair and its other terminal being connected to the first terminal of said second resistor, the second terminal of said second resistor being connected to the second wire of the second cable pair, the first and second resistors being substantially equal to each other; and a fourth capacitor having its first terminal connected to the first wire of the second cable pair and the second wire of the first cable pair, each of said capacitors being substantially equal to each other.

5. Apparatus for reducing the far-end crosstalk due to magnetic coupling between a first and a second cable pair in a telephone cable comprising, in combination, a first impedance connected across the receiving end of the first cable pair; a second impedance connected across the receiving end of the second cable pair, each of said impedances having a value equal to the characteristic impedance of the cable across which they are connected; an alternating current source connected to one end of one of the cable pairs; a detector connected to one end of the other of the cable pairs; and a balancing network connected to the other ends of both of the cable pairs, said balancing network including a plurality of mechanically coupled variable capacitors connected between at least one wire of the first cable pair and each of the other wires of the second cable pair and at least one variable resistor connected in series with one of the variable capacitors, the capacitors being substantially equal to each other.

References Cited in the file of this patent

UNITED STATES PATENTS

| | | |
|---|---|---|
| 1,751,333 | Jordan et al. | Mar. 18, 1930 |
| 2,675,428 | Steiltjes | Apr. 13, 1954 |